Patented Feb. 2, 1926.

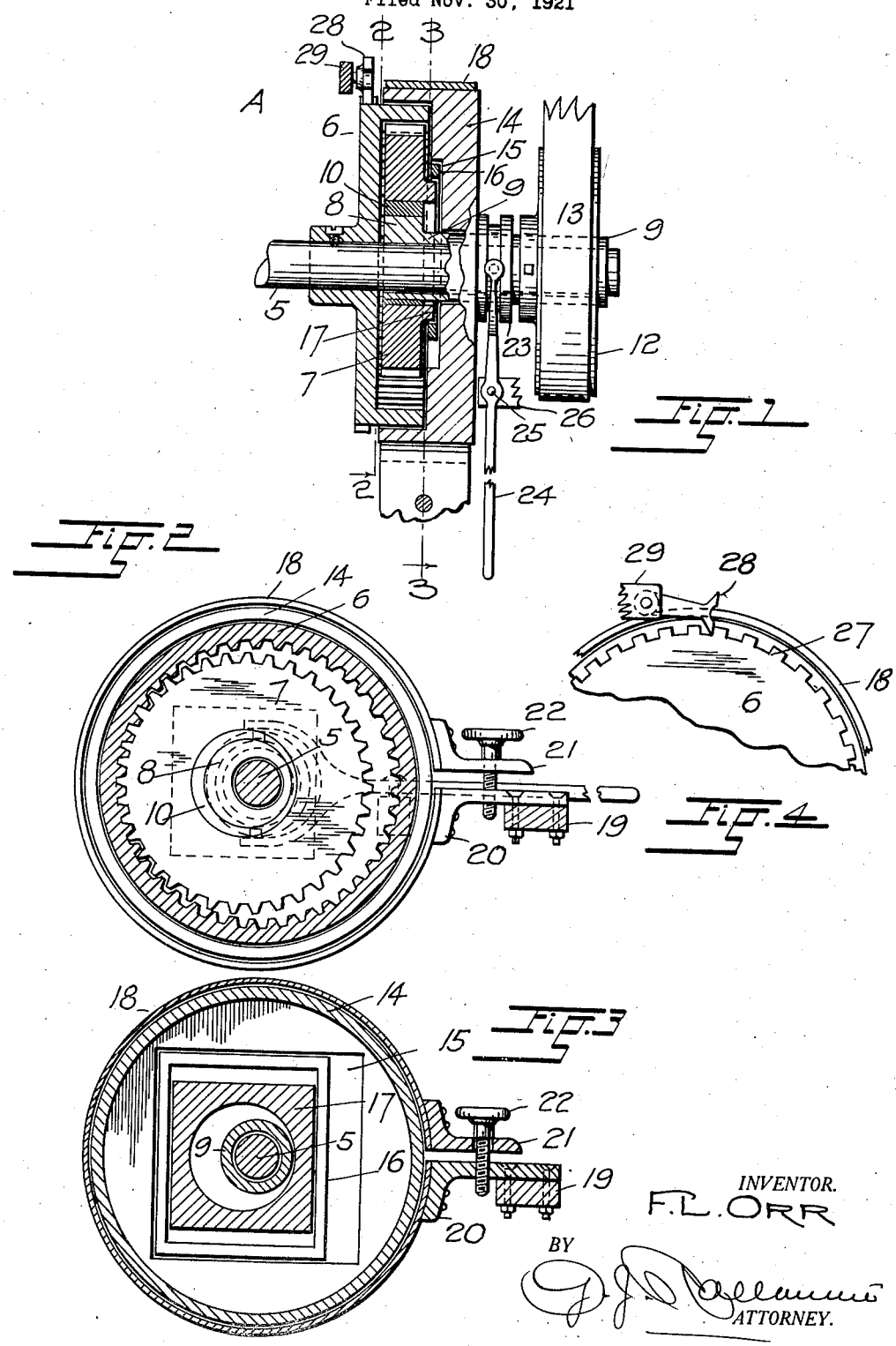

1,571,457

UNITED STATES PATENT OFFICE.

FRANCIS LEONARD ORR, OF DENVER, COLORADO.

TRANSMISSION GEARING.

Application filed November 30, 1921. Serial No. 518,867.

*To all whom it may concern:*

Be it known that I, FRANCIS L. ORR, a citizen of the United States, residing at Denver, in the county of Denver and State of Colorado, have invented certain new and useful Improvements in Transmission Gearing, of which the following is a specification.

My invention relates to transmission gearing and its principal object is to provide a mechanical movement of simple and efficient construction which is adapted to control the operation of a driven element by the manual adjustment of a brake upon a rotary member of the driving element.

Another object of the invention is to provide means for controlling the movement of the driven element under the influence of its load, when the transmission gearing is in a neutral condition.

With the above and other objects in view, my invention consists in the construction and arrangement of co-operating parts shown in the accompanying drawings in the several views of which like parts are similarly designated and in which Figure 1 represents a sectional elevation of the improved transmission gearing;

Figure 2, a section taken on the line 2—2, Figure 1;

Figure 3, a section along the line 3—3, Figure 1; and

Figure 4, a fragmentary view of the internal gear of the driving element of the movement, and the locking pawl thereof, looking in the direction of the arrow A, Figure 1.

Referring to the drawings, the reference numeral 5 designates the shaft of a tool, machine or other mechanism, which is supported for rotation in bearings not shown in the drawings.

Rigidly connected with the shaft is an internal gear-wheel 6, the teeth of which are engaged by an external gear-wheel 7 of smaller diameter. The external gear-wheel is mounted to move in the circle of the teeth of the internal gear-wheel, upon an eccentric head 8 of a sleeve 9 which loosely surrounds the shaft.

An eccentric bushing 10 fitted inside the central opening of the external gear-wheel, allows of adjustment of the latter to take up wear between its teeth and those of the internal gear-wheel in case of wear.

A pulley 12 mounted on the sleeve is connected with a conveniently located motor or other source of mechanical energy by a belt 13.

Loosely mounted on the sleeve between the pulley and the gear wheels, is a drum 14 which, for compactness in construction and for the exclusion of dirt from the meshing gear-wheels, is recessed to partially extend around the external gear-wheel.

The drum has in its surface facing the external gear-wheel, a rectangular slideway 15 in which a carrier-frame 16 of similar form has a rectilinear movement.

The external gear-wheel has a rectangular hub 17 which is fitted in the carrier frame to slide in a direction at right angles to the movement thereof in the slideway of the drum, and the parts thus arranged constitute coupling means and permit of an eccentric movement of the external gear-wheel on the drum when the latter is locked against axial rotation by the frictional contact of a brake band 18.

The band which surrounds the peripheral surface of the drum, is fastened at one end to a stationary support 19 through the medium of a bracket 20, and its opposite end carries a second bracket 21, and a handscrew 22 thereon, which by co-operative engagement with a threaded opening in the first mentioned bracket, serves to draw the band into engagement with the drum.

The drum has a circumferentially grooved hub 23 for the engagement of a shifting lever 24 fulcrumed at 25 on a relatively stationary support 26, which in the operation of the movement functions to bring the drum into frictional engagement with the internal gear-wheel and thereby control the movement of the shaft under the influence of the load when the transmission gearing is at rest.

The internal gear-wheel has circumferentially, a series of rectangular teeth 27 for the engagement of a locking pawl 28 on a stationary support 29 which holds the wheel against retrograde rotation by the influence of its load when the mechanism runs idle but permits of its moving in the opposite direction when the mechanism is in operation.

With the parts arranged as described, it will be seen that when the band 18 is loose on the drum, the rotary movement of the sleeve 9 imparted thereto by the pulley, will cause the drum to partake of the eccentric movement of the external gear which consequently moves idly about its axis in the circle of the teeth of the external gear-wheel, without exerting a rotative action thereon.

If, however, the drum is locked against rotation by means of the brake band, the external gear will move bodily in an orbit eccentric to the axis of the shaft and by engagement with the teeth of the internal gear, impart thereto an axial rotation at a reduced velocity.

My improved transmission gearing is particularly adapted for use in connection with the rotary element of a hoist or water elevator and it will be apparent that when the gearing has been placed in its neutral condition by loosening the brake band from the drum, retrograde movement of the shaft by the influence of the load is prevented by the engagement of the pawl 28 with the external teeth of the internal gear-wheel and that, when the gearing is in a condition of rest, the drum moved in contact with the external gear by means of the lever 24, will function as a friction brake to allow of gradually lowering the load by gravity.

Having thus described my invention what I claim and desire to secure by Letters Patent is:

1. In a transmission gearing, an internal gear-wheel, an external gear-wheel mounted to move eccentrically about the axis of the internal gear-wheel in the circle of the teeth thereof, a rotary drum adapted to guide the external gear-wheel in its eccentric movement when held against rotation and to rotate with the same when released, said drum having a lateral movement to frictionally engage with the internal gear-wheel, a brake for locking the drum against rotation, and a lever to move the drum into engagement with the internal gear-wheel.

2. In a transmission gearing an internal gear wheel, an external gear wheel mounted to move eccentrically about the axis of the internal gear wheel in the circle of the teeth thereof, a rotary drum movable laterally into and out of engagement with the internal gear, said drum and external gear having coupling means for connecting them to guide the external gear in its eccentric movement when the drum is held against rotation, means for moving the drum laterally into and out of engagement with an internal gear and means for controlling the rotation of the drum.

3. In a transmission gearing, an internal gear wheel, an external gear wheel mounted to move eccentrically about the axis of the internal gear wheel in the circle of the teeth thereof, a rotary drum adapted to guide the external gear wheel in its eccentric movement when held against rotation and to rotate with the same when released, said drum having a lateral movement to engage it with and disengage it from the internal gear wheel, means for moving the drum into and out of such engagement and means for controlling the rotation of the drum.

4. A transmission gearing comprising a shaft, an internal gear-wheel fixed thereon, a sleeve on the shaft, having an eccentric bearing inside of the internal gear wheel, an external gear wheel mounted on the bearing to move eccentrically in the circle of the teeth of the internal gear wheel and having teeth engaging the teeth of the internal gear wheel, a hollow rotary drum mounted upon the sleeve and having an annular flange extending from one side and extending the internal gear wheel, said drum serving to retain the external gear within the internal gear and exclude dust therefrom, a moving connection between the drum and the external gear wheel, and a brake to hold the drum against rotation.

5. A transmission gearing comprising a shaft, an internal gear-wheel fixed thereon, a sleeve on the shaft, having an eccentric bearing positioned within the internal gear, an external gear-wheel movably mounted on said bearing to move eccentrically in the circle of the teeth of the internal gear wheel and having teeth meshing with the teeth of the internal gear, a rotary drum upon said sleeve positioned in close relation to the internal gear and serving to retain the external gear within the internal gear and to exclude dust therefrom, and a brake to hold said drum against rotation.

In testimony whereof I have affixed my signature.

FRANCIS LEONARD ORR.